July 3, 1928.
F. B. MacLAREN
1,676,038
PUMP MODIFYING MECHANISM FOR FUEL FEEDING DEVICES
Original Filed April 1, 1922
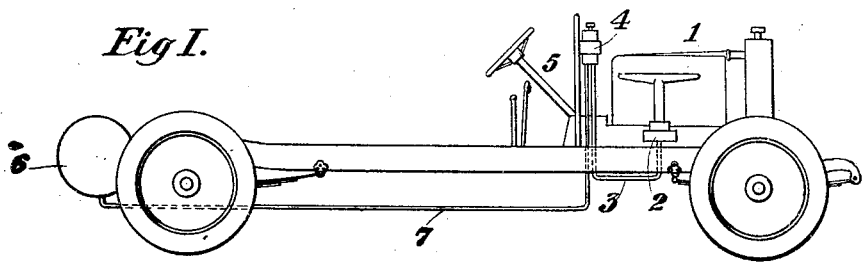
Fig. I.
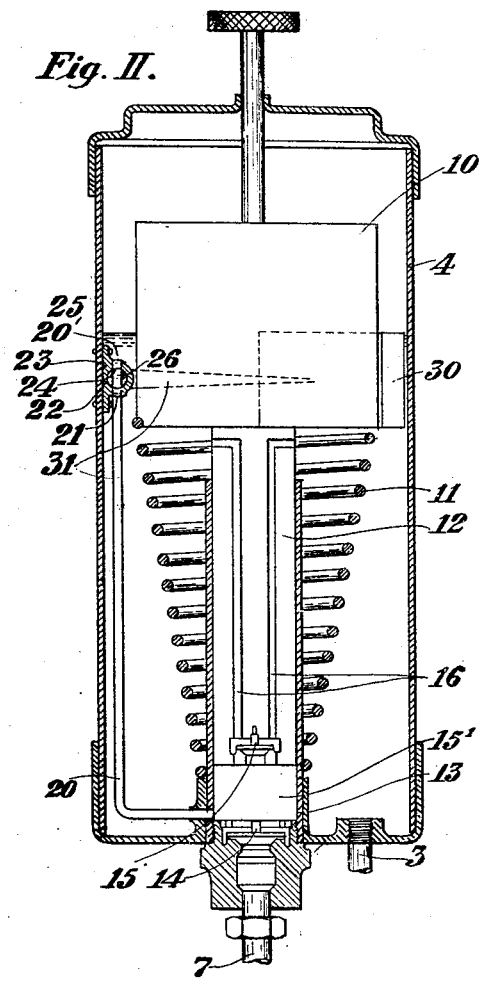
Fig. II.
INVENTOR
Fred B. MacLaren
BY Chester H Braselton
ATTORNEY Patented July 3, 1928.

1,676,038

UNITED STATES PATENT OFFICE.

FRED B. MacLAREN, OF JAMAICA, NEW YORK, ASSIGNOR TO CHESTER H. BRASELTON, OF NEW YORK, N. Y.

PUMP-MODIFYING MECHANISM FOR FUEL-FEEDING DEVICES.

Application filed April 1, 1922, Serial No. 548,867. Renewed June 16, 1927.

This invention relates to a system and mechanism for utilizing the relative movements of coacting means, actuated by vibration, for feeding fuel from a supply tank to a fuel consuming means such as the charge forming device of a power plant or an internal combustion engine of an automotive vehicle, with means to control the feeding action by means dependent upon the amount of liquid fed, the height thereof in an auxiliary tank, for example, or the pressure thereof to the charge forming device, which will be effective to positively disable the action of the feeding mechanism to further feed fuel from the fuel supply tank.

Further objects of the invention are to provide, in a fuel feeding system utilizing a pumping action, means to render the action automatically ineffective or inoperative when the fuel in an auxiliary tank, which may be located at a higher level than a main supply tank, reaches a certain level, by positively actuated means preventing the continued operation of the pumping mechanism from feeding more liquid from the supply tank.

In the embodiment of the mechanism shown and described in this application, I employ vibrations, such as are caused by moving vehicles or vehicles standing still but subjected to vibration, to bring about a lifting of a liquid from the lower supply tank on an automobile to a higher level tank from which the fuel may be fed as desired by gravity or otherwise to the engine; and I control the pressure at which the fuel is fed or the amount of liquid in the higher tank, by means actuated thereby for disabling the pumping mechanism, by modifying or changing the feeding operation as the pump action thereafter continues.

Various other objects are within the scope of this invention such as relate to the arrangement of the related elements or the structure, and to various details of construction and to economies of manufacture and numerous other features as will be apparent from consideration of the drawing and related description of a form of the invention, which may be preferred, in which, Fig. I is a diagrammatic view of an automobile with the invention applied thereto; and Fig. II is an enlarged vertical sectional view of one embodiment of the invention.

Referring to Figure I, I have illustrated an automobile engine 1 having a carburetor 2 fed with fuel through a pipe 3 from an auxiliary high level tank 4 secured to the dash 5. A supply tank 6, located at the rear, is connected by supply line 7 to the tank 4 as shown.

I employ an automatic pumping mechanism dependent upon vibration and operated by a variation or difference in the inertia of the cooperating parts of the mechanism to feed the liquid from the tank 6 to the auxiliary tank 4 and supply the same to the carburetor 2. Thus in Fig. II I have shown weight 10 in the tank 4, supported by the spring 11 and carrying a pumping piston 12 operating in the cylinder 13.

Cooperating valves 14 and 15, one in the inlet from the supply line 7 to the tank 4, and the other in the piston 12, form means to draw liquid into the pump chamber 15 and force the same through passages 16 in the pump piston into the tank 4.

Connected with the pump chamber 15 is an upwardly extending auxiliary pipe 20, the upper end of which is suitably anchored at 21 to the tank 4 and provided with a cut-off valve 22. In the particular embodiment shown, the valve casing 23 is provided with a diametrically opposite opening 24 which forms the upper open end 20' for the pipe 20. The valve 25 has a transverse passage 26 therein and adapted to be rotated to cut off communication from the pipe 20 to the interior of the tank 4 or moved to the position shown in Fig. II, to establish connection therebetween.

A float 30 which may be of a semi-annular construction to fit between the weight 10 and the wall of the tank 4 is connected by lever 31 to the valve 25 to be operated to form means to oscillate the same to open or close the connection through pipe 20 from the piston pump chamber 15 and the interior of the tank 4.

Operation of the mechanism described will be understood, and it will be seen that, when subject to vibration, the weight 10 moves the piston 12 in the piston cylinder and by the cooperation of the pump valves 14 and 15, liquid is drawn from the supply pipe 6 through the pipe 7 into the pump chamber 15 and discharged therefrom through the passages 16 to the tank 4. From the tank 4, the liquid fuel is fed through the pipe 3 to the carbureter 2.

When the liquid in tank 4 rises into engagement with the float 30, the same is raised to oscillate the valve 25 through the power multiplying lever 31. Normally, the valve passage 26 in the valve 25 cuts off communication from the pipe 20 to the chamber 4, but upon the movement thereof just described, the pump cylinder 15 is connected through the pipe 20, valve passage 26, valve casing opening 24 with the interior of the tank 4. The effect of this is to provide an auxiliary opening for the pump chamber 15 at a higher level than the valve 15, and the pump will merely draw liquid into the top of the pipe 20 and further pumping action in supplying liquid from the tank 6 to the auxiliary tank 4 is prevented without interfering with a continued movement of the pump parts upon being subjected to continued vibration.

As the liquid of the tank 4 is fed to the carburetor, the float 30 falls, cutting off the valve 25, whereupon the pump action of the valves 14 and 15 is resumed and fuel is again fed to the chamber 4.

The invention is an improvement over the joint application of Chester H. Braselton and Fred B. MacLaren, entitled "Method and apparatus for pumping fluids," Serial No. 531,137, "Vibration operated pumping mechanism", Serial No. 533,493, "Inertia operating pumps", Serial No. 533,495, and also my co-pending application, entitled "Controlling means for fuel feeding mechanism", Serial No. 548,866.

It is apparent that within the spirit of the invention, modifications and different arrangements may be made other than as herein disclosed, and the present disclosure is illustrative merely, the invention comprehending all variations illustrated.

Having thus described my invention, what I desire to secure by United States Letters Patent and claim is:

In a fuel supply system for internal combustion engines, the combination of a casing having an outlet port therein; pump mechanism within the casing, said pump mechanism including a cylinder; a piston movable within the cylinder; inlet and outlet valves in the pump cylinder; a weighted mass attached to the pump piston adapted to operate the piston through movement of the casing; a valve attached to the casing wall within the casing; float operated means for opening and closing the valve; and a conduit intermediate the valve and pump cylinder, said valve being normally closed but adapted to be opened when the float is lifted by flow of liquid into the casing.

In testimony whereof, I affix my signature.

FRED B. MacLAREN.